United States Patent [19]

Kimura et al.

[11] 4,316,927

[45] Feb. 23, 1982

[54] MAGNETIC RECORDING MEDIUM

[75] Inventors: Shigeo Kimura; Toshihiko Yamada, both of Tagajo, Japan

[73] Assignee: Sony Corporation, Tokyo, Japan

[21] Appl. No.: 8,766

[22] Filed: Feb. 2, 1979

[30] Foreign Application Priority Data

Feb. 9, 1978 [JP] Japan .................................. 53-13860

[51] Int. Cl.$^3$ ................................................ G11B 5/68
[52] U.S. Cl. ..................................... 428/216; 428/329; 428/336; 428/337; 428/694; 428/695; 428/900; 428/910; 427/129; 360/134
[58] Field of Search ............... 428/900, 910, 215, 480, 428/216, 329, 336, 337, 692, 694, 695; 427/129; 264/210.7; 360/134

[56] References Cited

U.S. PATENT DOCUMENTS

| | | | |
|---|---|---|---|
| 3,432,591 | 3/1969 | Heffelfinger | 427/129 |
| 3,901,851 | 8/1975 | Kohno et al. | 428/910 |
| 4,187,341 | 2/1980 | Suzuki et al. | 428/212 |
| 4,202,927 | 5/1980 | Yamaguchi et al. | 428/900 |

FOREIGN PATENT DOCUMENTS 48-20874  2/1973  Japan .............................. 264/210.7
1433344  4/1976  United Kingdom .............. 428/910

*Primary Examiner*—Stanley S. Silverman
*Attorney, Agent, or Firm*—Hill, Van Santen, Steadman, Chiara & Simpson

[57] ABSTRACT

In a magnetic recording medium comprising a flexible non-magnetic base and a magnetic layer carried by the base, composed of magnetic powder dispersed in a resinous binder, wherein the flexible non-magnetic base has a Young's modulus not less than 350 Kg/mm$^2$ in the longitudinal direction and a Young's modulus not less than 500 Kg/mm$^2$ in the direction transverse to the longitudinal direction, and a thickness from 6 to 14 microns, a ratio of the Young's modulus of the base in the longitudinal direction to the Young's modulus of the base in the direction transverse to the longitudinal direction is from 0.5 to 0.9, the magnetic layer has a Young's modulus from 700 to 1400 Kg/mm$^2$ in the longitudinal direction and a Young's modulus from 400 to 1100 Kg/mm$^2$ in the direction transverse to the longitudinal direction, and a thickness from 2 to 5 microns, a ratio of the Young's modulus of the magnetic layer in the longitudinal direction to the Young's modulus of the magnetic layer in the direction transverse to the longitudinal direction is from 1.3 to 1.9.

5 Claims, No Drawings

MAGNETIC RECORDING MEDIUM

BACKGROUND OF THE INVENTION

1. Field of the Invention

The present invention relates generally to a magnetic recording medium, and more particularly to a magnetic recording medium, for example, a magnetic tape having a magnetic layer formed on a flexible non-magnetic base.

2. Description of the Prior Art

A conventional magnetic tape is manufactured in a way that a magnetic paint or composition containing predominantly magnetic powders and resinous binder is coated on a flexible non-magnetic film and an axis of easy magnetization of the magnetic powder is then oriented in a predetermined direction. The non-magnetic film to be used there is composed of polyolefines, for example, polypropylene; cellulose derivatives, for example, cellulose triacetate and cellulose diacetate; or vinyl resins, for example, polyvinyl chloride. However, materials widely used for the base film are polyesters, for example, polyethylene terephthalate and polyethylene naphthalate which are superior in dimensional stability, cutting strength and so on. The polyester film is drawn or elongated more intensely in the longitudinal direction than in the width direction. There is used as the magnetic powder gamma hematite ($\gamma$-$Fe_2O_3$), magnetite ($Fe_3O_4$), gamma hematite-magnetite ($\gamma$-$Fe_2O_3$-$Fe_3O_4$), magnetizable material having high coercive force obtained by addition of cobalt to the above iron oxides, ferromagnetic chromium dioxide ($CrO_2$), acicular alloy powder, or these mixtures. The resinous binder is composed of thermoplastic resin, thermosetting resin, reactive resin, or these mixture.

Magnetic property or static characteristics of the magnetic tape prepared as described above depends mainly on the kind and performance of the magnetic powder. Physical and mechanical properties, however, of the magnetic tape mostly depend on the kind and perpormance of the non-magnetic film and performance of the magnetic layer itself. Recently, a magnetic tape has been widely used particularly for a video tape recorder (VTR) of helical scanning type because of the increased utility value. The VTR has come into more wide use since a so-called video cassette as a suitably-shaped casing receiving the magnetic tape was devised and used. In the VTR, the magnetic tape supported in the cassette is generally set in a loading state when used, in such a manner that it is drawn out of the cassette and then contacted with the circumference of a cylinder (head drum assembly) in a slant direction relative to a rotation plane of a rotating magnetic head. Under this condition, a recording or reproducing operation for the magnetic tape is effected with the magnetic head along the tracks slightly slanting relative to the longitudinal direction of the magnetic tape. Accordingly, the magnetic tape used in the video cassette is exposed to the loading state and severe use conditions, for example, a repeated running. For this reason, the magnetic tape must has a good mechanical strength and maintain a stable running property when used for a long time.

In such video cassette, it is desired that the amount or volume of the magnetic tape received therein is increased to effect a recording operation for a long time. However, it is in practice impossible to enlarge the size of the cassette so much. Accordingly, it is necessary to thin the magnetic tape itself so as to increase the amount to be received in the cassette. For example, the non-magnetic film of the magnetic tape is required to be as thin as possible. However, as a result of various experiments by the inventors, it has been found that the thinning of the magnetic tape by the use of the conventional technique results in a deterioration of a contacting condition (hereafter called "a head contact") between the magnetic tape and the magnetic head so that the magnetic tape can not be used in practice. The experimental results on the head contact regarding the conventional thinned magnetic tape are shown in the following Table I. In this case, the thickness of each magnetic layer is 4 microns and the base film is composed of polyethylene terephthalate. And when a Young's modulus of the base film and the magnetic layer in the longitudinal direction is represented by "LDE" and a Young's modulus of them in the width direction is represented by "TDE", a ratio of Young's moduluses (LDE/TDE) is 1.8 for the base film and 1.9 for the magnetic layer.

TABLE I

| Thickness of Base Film | Head Contact |
|---|---|
| 10$\mu$ | C |
| 14$\mu$ | B |
| 16$\mu$ | A |

In this Table, "A" shows a good result that a strong and flat output signal is obtained when an output signal or wave form on the reproducing operation is observed per one picture, "B" shows a not so good result that the output signal is distorted upward and downward at the central portion, and "C" shows a bad result that the output signal is weakened and distorted. These letters A, B and C defined as above are used in the same meaning also in the below description.

As apparent from the Table I, the head contact is deteriorated as the base film is thinner, which causes an unfavourable condition. The reason of the deterioration of the head contact is that the rigidity of the base film in the width direction is relatively lesser or the distortion of the base film in the same direction is larger due to the larger elongation degree or Young's modulus in the longitudinal direction than in the width direction. This causes a large distortion or deformation of the base film in the width direction when the magnetic head slides in the transverse direction to the longitudinal direction of the base film, so that the magnetic tape is distorted as if it were pushed up on the magnetic head. As a result, a spacing loss between the magnetic head and the magnetic layer occurs momentarily to deteriorate the head contact. Under this condition, particularly, a stable running property of the magnetic tape is obstructed, the magnetic tape can not endure a long-time use and further the electro-magnetic conversion characteristic is deteriorated.

OBJECT AND SUMMARY OF THE INVENTION

It is an object of the present invention to provide an improved magnetic recording medium.

It is another object of the present invention to provide a magnetic recording medium which is thinned and suitable for a long-time recording.

It is a further object of the present invention to provide a magnetic recording medium showing a superior mechanical strength, a stable running property and an improved head contact.

It is a still further object of the present invention to provide a magnetic recording medium which is thinned and suitable for long-time recording and shows a superior mechanical strength, a superior electro-magnetic conversion characteristic, a stable running property and an improved head contact.

According to one aspect of the present invention, there is provided an improved magnetic recording medium comprising a flexible non-magnetic base and a magnetic layer carried by the base, composed of magnetic powder dipersed in a resinous binder, the improvement in which the flexible non-magnetic base has a Young's modulus not less than 350 Kg/mm$^2$ in the longitudinal direction and a Young's modulus not less than 500 Kg/mm$^2$ in the direction transverse to the longitudinal direction, and a thickness from 6 to 14 microns, a ratio of the Young's modulus of the base in the longitudinal direction to the Young's modulus of the base in the direction transverse to the longitudinal direction is from 0.5 to 0.9, the magnetic layer has a Young's modulus from 700 to 1400 Kg/mm$^2$ in the longitudinal direction and a Young's modulus from 400 to 1100 Kg/mm$^2$ in the direction transverse to the longitudinal direction, and a thickness from 2 to 5 microns, a ratio of the Young's modulus of the magnetic layer in the longitudinal direction to the Young's modulus of the magnetic layer in the direction transverse to the longitudinal direction is from 1.3 to 1.9.

DESCRIPTION OF THE PREFERRED EMBODIMENTS

According to the present invention, the larger Young's modulus of the base in the width direction can bring about a good result on the head contact. The reason is that a repulsion force of the tape against the distortion in the width direction is increased because the rigidity of the tape in the width direction is increased. In the conventional technique, the tape is liable to be pushed up with the scanning of the magnetic head during the running operation due to the smaller rigidity in the width direction than in the longitudinal direction. On the contrary, according to the present invention, it is supposed that the Young's modulus or the rigidity of the base in excess of a predetermined value in the width direction results in a desired elastic characteristic in the same direction which can prevent the pushing-up of the tape by the magnetic head.

To obtain this superior result of the present invention, it is very important that the Young's modulus (LDE) of the base in the longitudinal direction is not less than 350 Kg/mm$^2$, the Young's modulus (TDE) of the tape in the width direction or the transverse direction to the longitudinal direction is not less than 500 Kg/mm$^2$, and the ratio of these Young's moduluses (LDE/TDE) is in the range from 0.5 to 0.9. The thickness of the base should be thin in the range from 6 to 14 microns. The ratio of the Young's moduluses of the magnetic layer in the longitudinal direction and the width direction, or LDE/TDE should be from 1.3 to 1.9 and the thickness of the magnetic layer should be from 2 to 5 microns. It is essential that the Young's modulus of the magnetic layer in the longitudinal direction is from 700 to 1400 Kg/mm$^2$, and the Young's modulus of the magnetic layer in the width direction is from 400 to 1100 Kg/mm$^2$.

Next, materials of the magnetic recording medium of the present invention will be explained.

The non-magnetic base may be composed of polyesters, for example, polyethylene terephthalate and polyethylene naphthalate; polyolefines, for example, polypropylene; cellulose derivatives, for example, cellulose triacetate; vinyl resins, for example, polyvinyl chloride and so on. Among these materials, polyethylene terephthalate is most superior as a base material of a magnetic tape because it has excellent heat-and moisture-resisting properties.

It is desirable that magnetic powder in the magnetic layer is acicular ferromagnetic powder. The acicular ferromagnetic powder preferably has a particle size that the length is from 0.2 to 1.0 micron, and a ratio of the length and the width or an acicular ratio (major axis length/minor axis length) is from 2 to 20. This powder may be composed of gamma hematite ($\gamma$-Fe$_2$O$_3$); magnetic (Fe$_3$O$_4$); mixed crystal of $\gamma$-Fe$_2$O$_3$ and Fe$_3$O$_4$; cobalt-doped $\gamma$-Fe$_2$O$_3$; cobalt-doped Fe$_3$O$_4$; cobalt-doped mixed crystal of $\gamma$-Fe$_2$O$_3$ and Fe$_3$O$_4$; chromium dioxide (CrO$_2$); various kinds of acicular magnetic alloy powders such as Fe-Co, Co-Ni, Fe-Co-Ni, Fe-Co-B, Fe-Co-Cr-B, Mn-Bi, Mn-Al, Fe-Co-V or the like; nitride of Fe, Fe-Co, Fe-Co-Ni or the like; or these mixture of more than two kinds of materials. Resins to be used as a binder in the magnetic layer may be a copolymer of vinyl chloride and vinyl acetate, a copolymer of vinyl chloride, vinyl acetate and vinyl alcohol, a copolymer of vinyl chloride, vinyl acetate and maleic acid, a copolymer of vinyl chloride and vinylidene chloride, a copolymer of vinyl chloride and acrylonitrile, a copolymer of acrylic acid ester and acrylonitrile, a copolymer of acrylic acid ester and vinylidene chloride, a copolymer of methacrylic acid ester and vinylidene chloride, a copolymer of methacrylic acid ester and styrene, a thermoplastic polyurethane resin, a phenoxy resin, polyvinyl fluoride, a copolymer of vinylidene chloride and acrylonitrile, a copolymer of butadiene and acrylonitrile, a copolymer of acrylonitrile, butadiene and acrylic acid, a copolymer of acrylonitrile, butadiene and methacrylic acid, polyvinyl butyral, polyvinyl acetal, a cellulose derivative, a copolymer of styrene and butadiene, a polyester resin, a phenol resin, an epoxy resin, a thermosetting polyurethane resin, an urea resin, a melamine resin, an alkyd resin, an urea-formaldehyde resin and so on. When a curing agent of polyisocyanate type is used as a crosslinking agent for the binder, the addition amount is preferably in the range from 10 to 40 percent by weight of the total amount of the binder. The binder can be used in an amount of 10 to 100 parts by weight, preferably 15 to 50 parts by weight based on 100 parts by weight of the magnetic powder.

Organic solvents to be used in preparation of a magnetic paint may be ketones, for example, acetone, methyl ethyl ketone, methyl isobutyl ketone and cyclohexanone; alcohols, for example, methanol, ethanol, propanol and butanol; esters, for example, methyl acetate, ethyl acetate, butyl acetate and ethyl lactate; glycol ethers, for example, ethylene glycol dimethyl ether, ethylene glycol monoethyl ether and dioxane; aromatic hydrocarbons, for example, benzene, toluene and xylene; aliphatic hydrocarbons, for example, hexane and heptane; or these mixtures. As occasion demands, various additives can be added to the magnetic layer in order to improve various characteristics thereof. These additives may be aluminum oxide, chromium oxide, silicon oxide or the like as a polishing particle to prevent head clogging; carbon black or the like as an antistatic agent; lecithin or the like as a dispersing agent; molybdenum disulfide, graphite, silicone oil or the like to impart a lubrication property to the magnetic layer; and so on.

The magnetic recording medium according to the present invention is useful as a magnetic tape particularly for a video tape recorder and can be used also as a magnetic tape for an audio tape recorder. The magnetic recording medium can take other forms excluding a form of the tape.

The present invention will be now explained in more detail with reference to the following specific examples. However, the examples are not to be constructed as limiting the scope of the present invention in any way.

In the examples, a base film drawn or elongated more intensely in the width direction than in the longitudinal direction is in general manufactured by the following method.

Melted linear polyethylene terephthalate is extruded from a die slit at 270° to 315° C. and then cooled to solidify with a cooling drum at 60° to 80° C. The solidified film is moderately elongated at 80° to 120° C. in the longitudinal direction and width direction like the conventional elongation method. After the film is subjected to heat setting under a temperature of 140° to 250° C., it is wound up. This manufacturing method may include a process wherein the elongating operations for the longitudinal direction and the width direction of the film are simultaneously effected. The elongation ratio depends on the sequence of each process, however, Young's moduluses in the longitudinal direction and the width direction of the film finally obtained and the ratio of both Young's moduluses can be well controlled.

Each magnetic tape is made by the use of thus obtained polyethylene terephthalate films having performances shown in the following Table II. These films are 10 microns in thickness respectively.

In this Table, the evaluation standard for the head contact is the same as that explained in the afore-said Table I, and the mechanical strength of each film is evaluated on the basis of load required for 5% elongation wherein "⊚" means a fairly good result, "O" means a good result and "Δ" means a not so good result.

The magnetic paint is prepared and coated on the film as follows:

The following composition of the magnetic paint is used:

| | |
|---|---|
| Ferromagnetic chromium dioxide powder*1 | 400 parts by weight |
| Nitrocellulose*2 (a resinous binder) | 40 parts by weight |
| Thermoplastic polyurethane resin*3 (a resinous binder) | 30 parts by weight |
| Butadiene-acrylonitrile copolymer*4 (a resinous binder) | 30 parts by weight |
| Lecithin (a dispersing agent) | 2 parts by weight |
| Olive oil (a lubricant) | 2 parts by weight |
| Toluene (a solvent) | 300 parts by weight |
| Methyl ethyl ketone (a solvent) | 300 parts by weight |
| Ethyl acetate (a solvent) | 300 parts by weight |

*1 a magnetic powder having an average particle length of 0.7 micron and an average acicular ratio of 14.
*2 a commercially available binder available under the trade name "H½" from Asahi Kasei Kogyo Kabushiki Kaisha.
*3 a commercially available binder available under the trade name "Estane 5702" from B. F. Goodrich Corp.
*4 a commercially available binder available under the trade name "Hycar 1432" from B. F. Goodrich Corp.

These ingredients are blended with each other by a ball mill for 15 hours. After the resulting magnetic mixture is taken out therefrom, a commercially available polyisocyanate compound as a curing agent available under the trade name "Desmodur L" from Bayer A. G. is added in an amount of 15 (per hundred resin) to the mixture immediately before the coating onto the base film. The mixture is then stirred for 30 minutes and subsequently coated on the base film such that the thickness of the coating (magnetic layer) after a mirror plane processing is 4 microns. The axis of easy magnetization of the magnetic powder in the coating is magnetically oriented in the transverse direction to the longitudinal direction so as to be suitable for a video tape recorder of helical scanning tape. The film with the magnetically treated coating is dried and wound up. Thereafter the film is subjected to a curing treatment and a mirror plane processing. The film is finally slit to make a desired magnetic video tape having a width of ½ inch. Data on characteristics of the tape are shown in the below Table II.

TABLE II

| Example | Young's Modulus in the longitudinal direction: LDE (Kg/mm$^2$) | Young's Modulus in the width direction: TDE (Kg/mm$^2$) | LDE/TDE | Head Contact | Load for 5% Elongation |
|---|---|---|---|---|---|
| 1 | 750 | 400 | 1.875 | C | ⊚ |
| 2 | 540 | 450 | 1.200 | B | ⊚ |
| 3 | 460 | 511 | 0.900 | A | ⊚ |
| 4 | 462 | 560 | 0.825 | A | ⊚ |
| 5 | 434 | 616 | 0.704 | A | ⊚ |
| 6 | 410 | 630 | 0.650 | A | ⊚ |
| 7 | 350 | 700 | 0.500 | A | O |
| 8 | 300 | 750 | 0.400 | B | Δ |

Table II apparently shows that the head contact is not deteriorated when LDE/TDE is from 0.5 to 0.9 (Examples 3 to 7) whereas it is deteriorated when LDE/TDE is in excess of 0.9. It will be also confirmed that the sample of Example 8 shows a relatively good head contact, however, the mechanical strength such as a load for 5% elongation is not sufficient so that a tracking deviation and the like are apt to occur when the tape is used in a video cassette. Accordingly, it is indispensable that the Young's modulus of the base film in the longitudinal direction is in exess of 350 Kg/mm$^2$ and LDE/TDE is in the range from 0.5 to 0.9, from the view point of the head contact. The Young's modulus of the base film in the width direction should be in excess of 500 Kg/mm$^2$ because a lower Young's modulus than that value causes an edge of the tape to be bent.

Next, Young's moduluses of the magnetic layer will be studied. The following Table III shows data of a running property and a head contact which were measured on a magnetic tape in which a magnetic layer having a thickness of 4 microns and a given ratio of Young's moduluses in the longitudinal and width directions (LDE/TDE). A composition of the magnetic paint here used in different from the afore-said composition only in that magnetic powder is composed of the following material of the Table III.

According to this result, the ratio of Young's moduluses (LDE/TDE) of the coating in excess of 1.3 is necessary for maintaining a good running property. When this ratio is smaller than that value, the running property becomes unstable and a picture obtained from the video tape recorder is in disorder or distorted, and in a worse case the tape adheres onto a part such as a cylinder (head drum) so that the running is shut off. This phenomena seem to be based upon the fact that the coating becomes soft with a decrease of elastic modulus.

TABLE III

| Magnetic Powder in Magnetic Paint Composition | Ratio of Young's Moduluses of Magnetic Layer LDE/TDE | Running Property (Number of Times of Tape Running) | Head Contact |
| --- | --- | --- | --- |
| $Co—\gamma-Fe_2O_3$ (having average particle length of 0.4 micron and average acicular 6) | 1.15 | less than 70 times | A |
| $Co—\gamma-Fe_2O_3$ (having average particle length of 0.5 micron and average acicular ratio of 8) | 1.3 | more than 100 times | A |
| Mixture of $CrO_2$ and $Co—\gamma-Fe_2O_3$ having average particle length of 0.5 micron and average acicular ratio of 8 ($CrO_2:Co—\gamma-Fe_2O_3 = 1:1$) | 1.5 | more than 100 times | A |
| $CrO_2$ | 1.9 | more than 100 times | A |

To raise a mechanical strength of the tape, it is advantageous that the ratio of Young's moduluses (LDE/TDE) or the Young's modulus (LDE) in the longitudinal direction is increased. However, LDE/TDE should be in practice less than 1.9, because it is difficult from the viewpoint of productivity to increase the ratio excessively as well as no practical trouble in operation appears even if the ratio is not so high. In the data of the above Table III, a magnetic powder in the magnetic layer is cobalt-iron oxide when the ratio of Young's moduluses of the coating is 1.3, and a magnetic powder in the magnetic layer is $CrO_2$ when the ratio of Young's moduluses of the coating is 1.9. The process of forming these magnetic layers, and the like are the same as those already described.

A suitable selection of thickness of the magnetic recording medium according to the present invention is very significant for achieving the thinning of the medium and obtaining a good mechanical property, which will be explained as follows.

The following Table IV shows data on a head contact and a mechanical property (edge bending of tape) which were measured on a polyethylene terephthalate film showing LDE/TDE of 0.825 when the thickness was variously changed. Here, the magnetic coating is 4 microns in thickness and $CrO_2$ is used as the magnetic powder.

TABLE IV

| Thickness of Film ($\mu$) | Head Contact | Mechanical Strength (Edge Bending) |
| --- | --- | --- |
| 14 | A | |
| 12 | A | |
| 10 | A | |
| 8 | A | |
| 6 | A | Δ |
| 4 | C | X |

According to this result, superior characteristics on the head contact can be kept according to the present invention even if the thickness of the base film is less than 14 microns. However, in the conventional technique, lesser thickness of the base film substantially than 14 microns causes a deterioration of the head contact and a great trouble in the thinning of the tape. When the thickness of the base film is too thin, the mechanical strength is considerably lowered and the edge bending of the tape is apt to occur. Therefore, the thickness of the base film should be in the range from 6 to 14 microns.

Further, a limitation of thickness of the magnetic layer to a certain range is very important for maintaining a good head contact and electro-magnetic conversion characteristic of the tape. The following Table V shows a head contact and a video sensitivity of video tapes having different thickness of magnetic coatings. Those video tapes are manufactured in a way that the afore-said magnetic composition for a video tape recorder is coated on a polyethylene terephthalate film as a base film showing LDE/TDE of 0.825 and having a thickness of 10 microns to form six video tapes having different coating thickness.

TABLE V

| Thickness of Magnetic Layer ($\mu$) | Video Sensitivity (dB) | Head Contact |
| --- | --- | --- |
| 6 | 0 | A |
| 5 | 0 | A |
| 4 | 0 | A |
| 3 | −0.5 | A |
| 2 | −1.5 | A |
| 1 | −5.2 | B |

It is preferable for a long-time recording of a video tape that the magnetic coating is thinner as well as the base film. However, too small thickness of the coating results in a deterioration of the head contact based on generation of a spacing between the tape and the head. Such spacing is caused by a surface property of the magnetic layer. From this point, the lower limit of the coating thickness should be 2 microns. On the other hand, a video sensitivity can not be so much improved even if the coating thickness is increased. Accordingly, the coating thickness should be less than 5 microns for the thinning of the tape.

As is apparent from the foregoing description, the magnetic recording medium of the present invention is particularly useful for a long-time recording or image transcription using a video cassette because of a superior head contact, a mechanical strength resistive to hard work, a stable running property and a good electro-magnetic conversion characteristic.

What is claimed is:

1. In magnetic recording medium of the type in which a magnetic layer composed of magnetic powder dispersed in a resinous binder is carried by a flexible non-magnetic base, wherein the improvement comprises:

said magnetic layer having an unbalanced longitudinal and transverse tensile strength relationship comprising:
a layer having a thickness of between 2 to 5 microns;
a Young's modulus of from 700 to 1400 kg/mm² in the longitudinal direction; and
a Young's modulus of from 400 to 1100 kg/mm² in the direction transverse to the longitudinal direction, wherein the ratio of the longitudinal Young's modulus to the Young's modulus in the direction transverse thereto is from 1.3 to 1.9; and said non-magnetic base having an unbalanced longitudinal and transverse tensile strength relationship comprising:
a layer having a thickness of between 6 to 14 microns;
a Young's modulus of not less than 350 kg/mm² in the longitudinal direction; and
a Young's modulus of not less than 500 kg/mm² in the direction transverse to the longitudinal direction, wherein the ratio of the longitudinal Young's modulus to the Young's modulus in the direction transverse thereto is from 0.5 to 0.9.

2. In a magnetic recording medium according to claim 1, wherein said flexible non-magnetic base is a polyethylene terephthalate film.

3. In a magnetic recording medium according to claim 1, wherein said magnetic powder is an acicular ferromagnetic powder having a length of 0.2 to 1.0 micron and an acicular ratio (major axis length/minor axis length) of 2 to 20.

4. In a magnetic recording medium according to claim 1, wherein said magnetic layer further contains polishing particles, antistatic agents, dispersing agents and lubricants.

5. Use of a magnetic recording medium according to claim 1, wherein the magnetic recording medium is a magnetic tape particularly for a video tape recorder of helical scanning type.

* * * * *